Dec. 22, 1953   J. A. LE CLAIR   2,663,433
MOBILE VEHICLE WITH LOAD BOOM AND MOBILE STABILIZER
Filed April 15, 1950   2 Sheets-Sheet 1
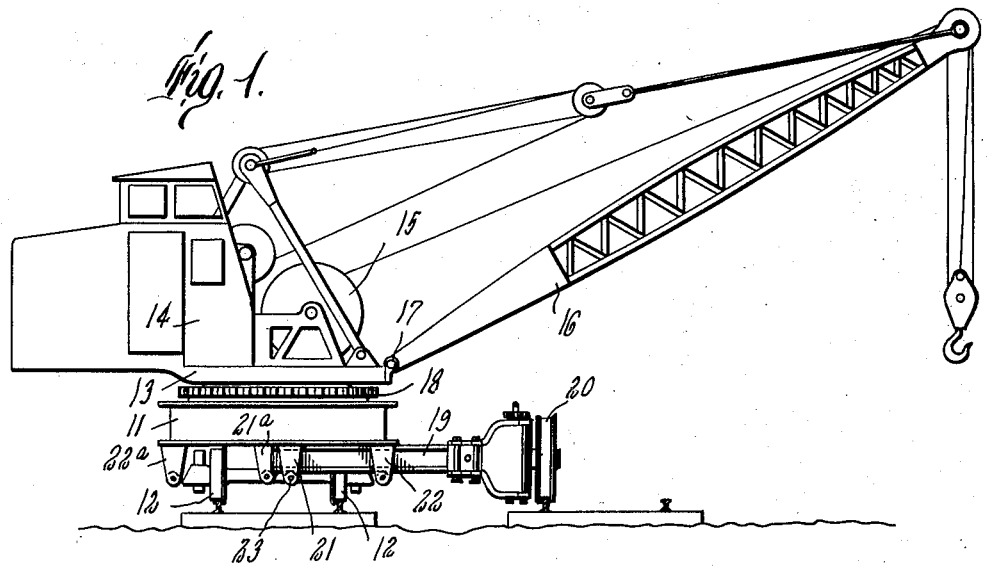
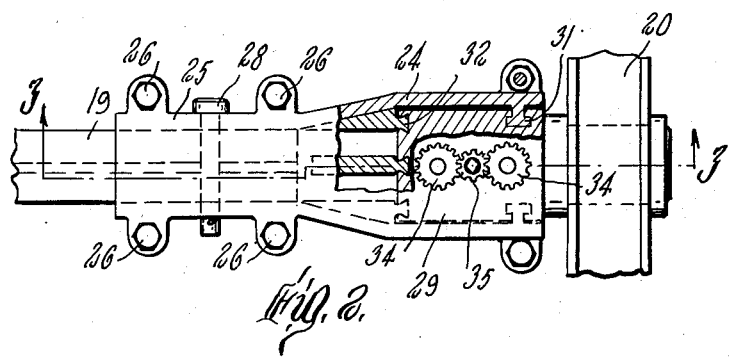
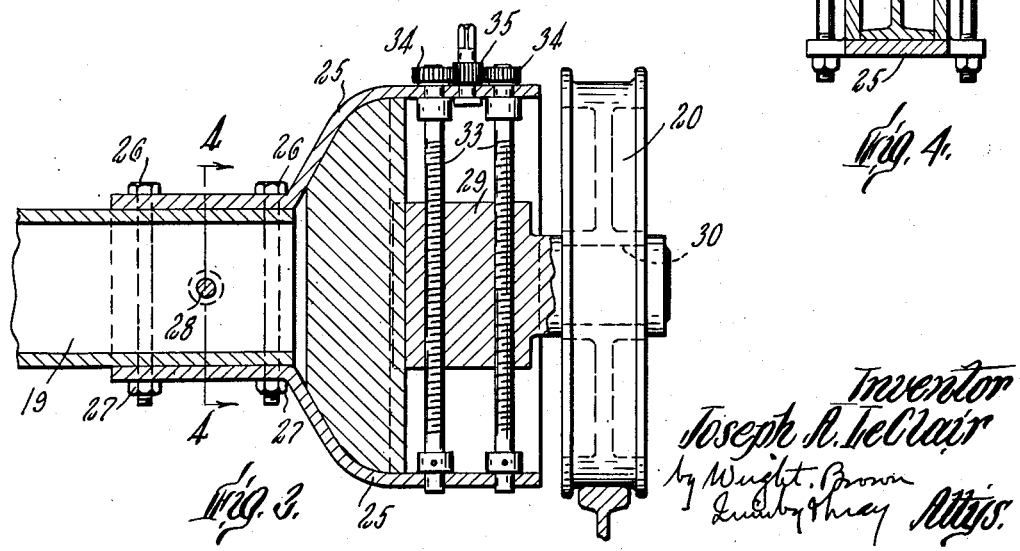

Dec. 22, 1953                J. A. LE CLAIR                    2,663,433
            MOBILE VEHICLE WITH LOAD BOOM AND MOBILE STABILIZER
Filed April 15, 1950                                    2 Sheets-Sheet 2
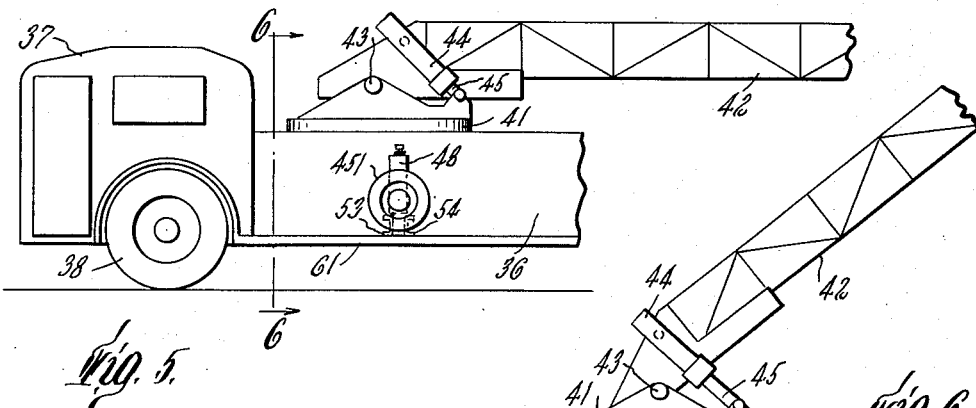
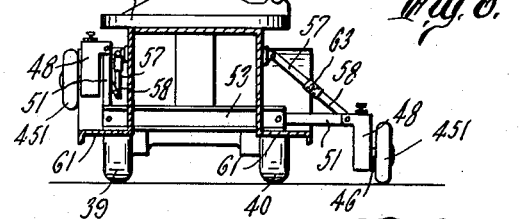
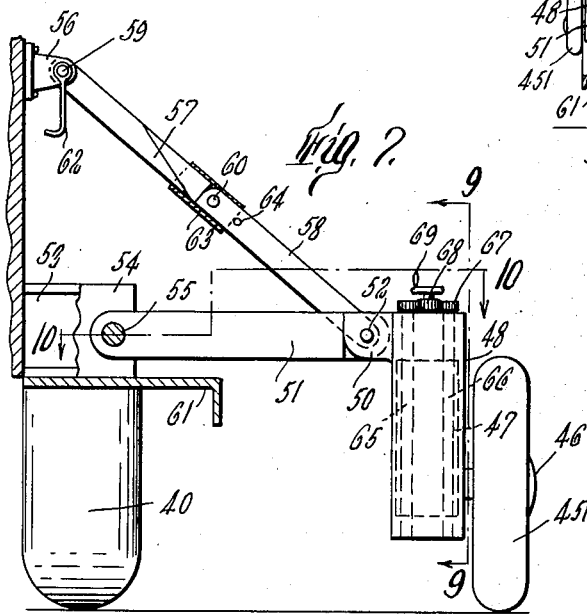
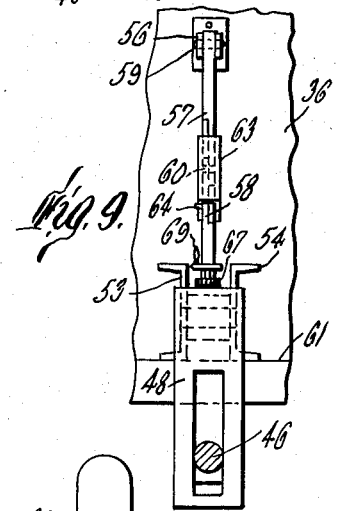
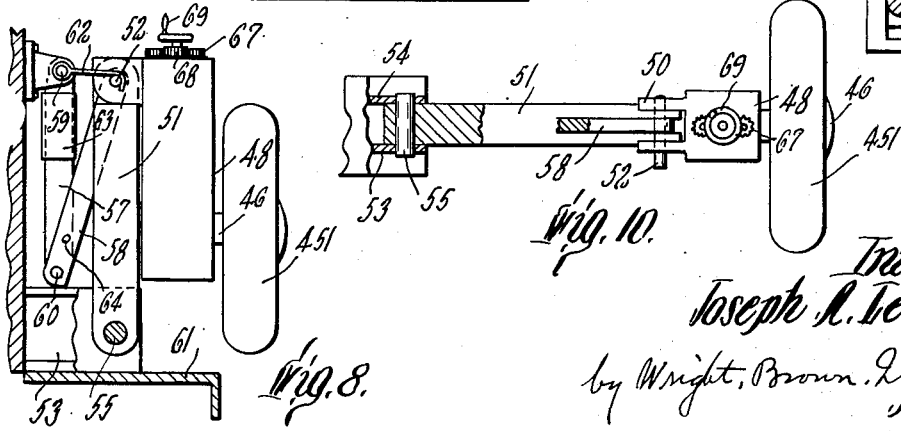

Patented Dec. 22, 1953

2,663,433

UNITED STATES PATENT OFFICE 2,663,433

MOBILE VEHICLE WITH LOAD BOOM AND MOBILE STABILIZER

Joseph A. Le Clair, Lewiston, Maine

Application April 15, 1950, Serial No. 156,063

2 Claims. (Cl. 212—145)

This invention relates to vehicles of the type which carry a boom or arm capable of being raised and lowered to lift or carry loads and of being turned about a vertical axis so as to pick up and deliver a load at either side or in front or rear of the vehicle. Vehicles in the category to which the invention relates include cranes, designed to run on rails or on the ground, power shovels, tractor cranes, trucks equipped with booms adapted to serve as cranes, fire ladder trucks with extension ladders, and other vehicles of analogous character. The essential characteristics of such vehicles is that they are mobile, usually being propelled by self contained motive equipment, and have swiveled arms or booms which can be swung laterally and raised and lowered. In the case of an extension ladder truck, the ladder is considered as a load carrying boom, the load being the firemen who climb up and down on the ladder and the persons who are rescued from burning buildings by the firemen.

The object of the invention is to provide in connection with such vehicles stabilizing means which is also movable with the vehicle disposed so as to afford an additional support, or broadened base at the side to which the load carrying arm extends; which, by being movable with the vehicle, enables the position of the vehicle to be shifted without requiring any adjustment of the arm or of any stationary base.

Two embodiments of the invention are shown in the accompanying drawings, one being a steam driven railroad crane, and the other being a fire department truck equipped with an extension ladder which is pivoted at one end to a turn-table arranged to turn about a vertical axis.

In the drawings,

Fig. 1 shows a front view of the railroad crane above referred to disposed with its load lifting boom extending squarely to one side and in a lowered position;

Fig. 2 is a detail view on a larger scale showing part of a stabilizer for the crane and a wheel mounted detachably on the stabilizer; part of the structural combination being broken away and shown in section;

Fig. 3 is a longitudinal section taken on line 3—3 of Fig. 2;

Fig. 4 is a cross section taken on line 4—4 of Fig. 3;

Fig. 5 is a fragmentary side elevation of a fire department truck equipped with an extension ladder and stabilizers;

Fig. 6 is a cross section of the truck on line 6—6 of Fig. 5, and an elevation of the parts at the rear of that line, showing the ladder elevated and one of its mobile stabilizers extended to give lateral support to the truck;

Fig. 7 is an enlarged detail view of one of the lateral stabilizers showing it extended in operative position;

Fig. 8 is a view similar to Fig. 7 showing the stabilizer in the position which it occupies when not needed for imparting stability;

Fig. 9 is a side view of the stabilizer as seen from the right of Fig. 7, and a section on line 9—9 of Fig. 7;

Fig. 10 is a sectional plan view taken on line 10—10 of Fig. 7.

Like reference characters designate the same parts wherever they occur in all the figures.

The railroad crane shown in Fig. 1 is a standard machine having a body 11, flanged wheels 12 designed to run on railroad tracks, and a turn-table 13 on which an engineer's cab 14 and hoisting machinery 15 are mounted and to which one end of an arm or boom 16 is connected by a pivot 17 so that it can be raised and lowered. The details of the hoisting machinery, load line, boom line, and mechanism for rotating the turn-table involve nothing novel and need not be described although, in passing, it may be remarked that a large gear wheel 18 secured coaxially to the turn-table is shown as part of the means for rotating it.

The invention comprises the combination of the crane, whether of the design here shown or of a different design, with a traveling stabilizer or lateral support. The stabilizer in the present illustration comprises a strong and rigid beam 19 connected to the crane body 11 so that it can be extended laterally to either side or retracted, and a wheel 20 on the outer end of the beam.

The means for connecting the stabilizer beam adjustably to the body comprise a pair of inner lugs 21 near the longitudinal center line of the body and a pair of outer lugs 22 near the side boundary of the body; these lugs being rigidly secured to the under side of the body. The lugs of each pair are separated widely enough to permit the beam 19 to be passed between them. They are longer than the depth dimension of the beam and carry bolts 23 in their lower ends on which the beam rests and on which nuts are threaded whereby the lugs can be tightened up to clamp the beam.

Similar inner lugs 21a and 22a are provided at the opposite sides of the center line of the crane to permit placement of the beam in extension to the opposite side.

The wheel 20 is detachably mounted on the beam 19 and is connected with adjusting means whereby it may be raised or lowered as may be needed for leveling purposes. The attaching means for the wheel comprises a housing 24 having a neck portion 25 which embraces the beam with a sliding fit and is provided with bolts 26 and nuts 27 whereby it is clamped to the beam. A pin or bolt 28 is passed through alined holes in the opposite sides of the neck and in the web portion of beam 19 near the outer end of the latter to furnish complete security against possible slipping.

A block 29, carrying a pivot 30 on which the wheel 20 is mounted, is fitted to slide vertically inside a widened part of the housing 24 which projects beyond the end of beam 19. Complemental tongues 31 and 32 on parts of the housing and groove in adjacent parts of the block 29 assist in guiding the block.

Two screws 33 pass through the block in threaded engagement with tapped holes in the latter and are journaled at their ends in the top and bottom walls of the housings, being prevented from displacement endwise by collars which abut against the inner sides of the walls. The upper ends of the screws carry gears 34 in mesh with a driving gear 35 on a stud shaft journaled between the screws in the top wall of the housing. The stud shaft has a squared end portion on which a wrench can be placed for turning it so as to raise and lower the wheel.

As here shown, the wheel 29 is a steel wheel formed with two flanges adapted to run on a railroad rail. When the crane is used in a railroad yard containing many tracks, this stabilizing wheel can be placed on the nearer rail of an adjacent track. Or, in other situations where a permanent rail at one side is not available, a rail can be laid on the ground to support it.

However, other types of wheel equipped with hard rubber tires, or pneumatic tires, can be provided equipped to bear directly on the ground.

With this stabilizer, the crane can be moved forward and back while the boom with a suspended load overhangs at the same side as the stabilizer. It is not necessary to swing the boom to a mid fore and aft position or remove any blocking from beneath the beam 19 and replace any blocking after the crane has been moved to a different position. The combination of the traveling stabilizer with the crane simplifies the labor of the people who operate it and makes its use much more rapid and efficient.

The ladder truck shown in Figs. 5 and 6 typifies other load-arm carrying vehicles which are normally designed to run directly on the ground without tracks. The body of the truck is shown at 36, the cab at 37, and one of the front wheels at 38 in Fig. 5. Fig. 6 shows both rear wheels 39 and 40, one of which is shown in part on a larger scale in Fig. 7.

A turn-table 41 is mounted on the truck body and the base of a long extension ladder 42 is pivoted to the turn-table at 43. Standard mechanism driven by the power unit of the truck is provided to rotate the turn-table and to raise the ladder from a horizontal position and lower it. Part of the mechanism for the latter purpose is shown here as a hydraulic cylinder 44 connected to the ladder structure and a plunger 45 connected to the turn-table.

When the ladder is turned to one side of the truck at a low angle of elevation, a strong force tending to overturn the truck is exerted, particularly if men are on the ladder. To counterbalance such overturning force, I have provided a stabilizer wheel 451 and means for connecting the wheel to the body with provisions for placement in operative and inoperative positions and for adjustment up and down when in the operative position.

The wheel is mounted on a stud axle 46 connected to a block or piston 47 which has a sliding fit in the housing. The housing in turn is provided with two laterally projecting lugs 50 at its upper end, between which one end of a link 51 is connected by a pivot 52. The opposite end of the link 51 enters between the ends of two parallel channel bars 53 and 54 and is connected to them by a pivot 55.

These channel bars extend from side to side across the lower part of the width of the truck body and both ends protrude. The link 51 is pivoted to the protruding ends of the bars at one side of the body and a similar link, forming part of a similar stabilizer combination, is pivoted to the protruding ends at the opposite side of the body.

A brace extends between the pivot 52 and a bracket 56 secured to the side of the truck body above the space between the bars 53 and 54. This brace is collapsible, being formed of two links 57 and 58, the former of which is pivoted at 59 to the bracket 56, and the latter is connected to the housing 48 by the pivot 52. Their adjacent ends overlap and are connected by a pivot 60. Pivots 52 and 59 are located at approximately equal distances from the pivot 55 and the links 57 and 58 are approximately equal in length. Thereby the parts are enabled to fold up into the position shown in Fig. 8 where the stabilizer is close to the side of the truck body with its wheel above the step 61 at the side of the vehicle and, consequently, well clear of the ground. Any desired holding means can be provided to retain the stabilizer in its raised and collapsed position. For example, a hook 62 may be pivoted on an extension of the pivot 59 and arranged to catch over an extension of the pivot 52.

When the brace is extended the links 57 and 58, which are then brought into line, are prevented from collapsing by a sleeve 63 which surrounds the link 57 and is fitted to slide thereon and across the joint 60. It may be noted that the links are reduced to half their width at the ends which overlap, so that their combined thickness is no greater at the joint than elsewhere. Thus the sleeve is enabled to slide from a raised position on link 57 when the brace is collapsed to a position where it extends to equal distances at each side of the joint, and in which it is arrested by a stop 64.

The means for adjusting the stabilizer wheel 451 vertically are similar in this combination to that in the one previously described. Two threaded rods 65 and 66 pass through threaded holes in the block or piston 47 and are journaled in the heads of housing 48 with provisions for preventing their endwise movement. They carry gears 67 on their upper ends which mesh with a common driving gear 68 to which a crank 69 is secured.

This stabilizer can be easily and quickly extended for use when need arises to turn the ladder to one side of the truck and place it at an inclination low enough such that its weight, or its weight plus a load of a number of persons, would risk overturning the truck. It can remain in the extended position and roll over the ground when the truck needs to be shifted, as for bringing the latter from one part to another of a burning building.

Various modifications may be made from the structures here shown without departing from the spirit and scope of the invention. For example, instead of using mechanical power, exerted manually, for raising and lowering the stabilizer wheel, steam or hydraulic power can be used. The railroad crane is provided with a steam generator for providing power to operate the crane, and may be provided with a steam cylinder and a piston carrying the stabilizer wheel and having supply and exhaust connections for steam. Also the truck, which has a hydraulic pumping means for operating the extension ladder, may be provided with connections between such pumping means and the block or piston carrying the stabilizer wheel for automatic power actuation.

What I claim is:

1. A mobile crane comprising a body, a turn-table on the body rotatable about a vertical axis, a boom pivoted to the turn-table so as to be raised and lowered, hoisting mechanism on the turn-table connected with the boom for raising and lowering it and for suspending loads on the boom, a beam secured to the crane with provisions for adjustment so as to extend more or less far laterally from the crane, a housing secured to the outer end of said beam, a wheel holder mounted for vertical movement in said housing, and including a laterally extending wheel pivot, a supporting wheel mounted rotatably on said pivot, and screw mechanism interengaged with the wheel holder and housing for adjusting the wheel holder and housing vertically.

2. A mobile crane comprising a body, a turn-table on the body rotatable about a vertical axis, a boom pivoted to the turn-table so as to be raised and lowered, hoisting mechanism on the turn-table connected with the boom for raising and lowering it and for suspending loads on the boom, a beam secured to the crane with provisions for adjustment so as to extend more or less far laterally from the crane, a wheel holder mounted for vertical movement on said beam at the outer end thereof, a wheel rotatably mounted on said holder to rotate about an axis parallel to the axis of said beam, and means carried by said beam for adjusting the wheel and holder vertically.

JOSEPH A. LE CLAIR.

References Cited in the file of this patent
UNITED STATES PATENTS

| Number | Name | Date |
|---|---|---|
| 560,086 | Dobkins | May 12, 1896 |
| 754,546 | Deady | Mar. 15, 1904 |
| 884,960 | Suiter | Apr. 14, 1908 |
| 1,432,378 | Bailly | Oct. 17, 1922 |
| 1,519,117 | Cochran | Dec. 16, 1924 |
| 1,529,069 | Lehman et al. | Mar. 10, 1925 |
| 1,782,406 | Bureau | Nov. 25, 1930 |
| 1,873,433 | Larsen | Aug. 23, 1932 |